United States Patent [19]

Koike

[11] 3,948,430
[45] Apr. 6, 1976

[54] METHOD OF MAKING AN AUTOMOBILE WINDOW AND FRAME

[75] Inventor: Shyouichi Koike, Tokyo, Japan

[73] Assignee: Nissan Motor Co., Ltd., Yokohama, Japan

[22] Filed: Feb. 19, 1974

[21] Appl. No.: 443,620

[30] Foreign Application Priority Data

Feb. 20, 1973 Japan............................. 48-21746[U]

[52] U.S. Cl.................................. 228/141; 296/146
[51] Int. Cl.²...................... B23K 31/02; B60J 1/00
[58] Field of Search...... 29/475, 478; 296/146, 148; 228/141

[56] References Cited
UNITED STATES PATENTS

| | | | |
|---|---|---|---|
| 2,067,939 | 1/1937 | Morrison | 296/146 |
| 2,772,915 | 12/1956 | Renno | 296/146 X |
| 2,814,525 | 11/1957 | Thomas | 296/146 X |
| 3,776,591 | 12/1973 | Krueger | 296/146 |

*Primary Examiner*—Al Lawrence Smith
*Assistant Examiner*—Margaret Joyce

[57] ABSTRACT

The edge portion of a hole in an inner panel of an automobile rear pillar is bent to form an inwardly opening channel to facilitate spot welding. The edge portion of an aligned hole in an outer panel of the rear pillar is bent inwardly to mate with the radially inner surface of the channel and is welded thereto to form a window frame. A windowpane is pivotally mounted in the window frame.

5 Claims, 5 Drawing Figures

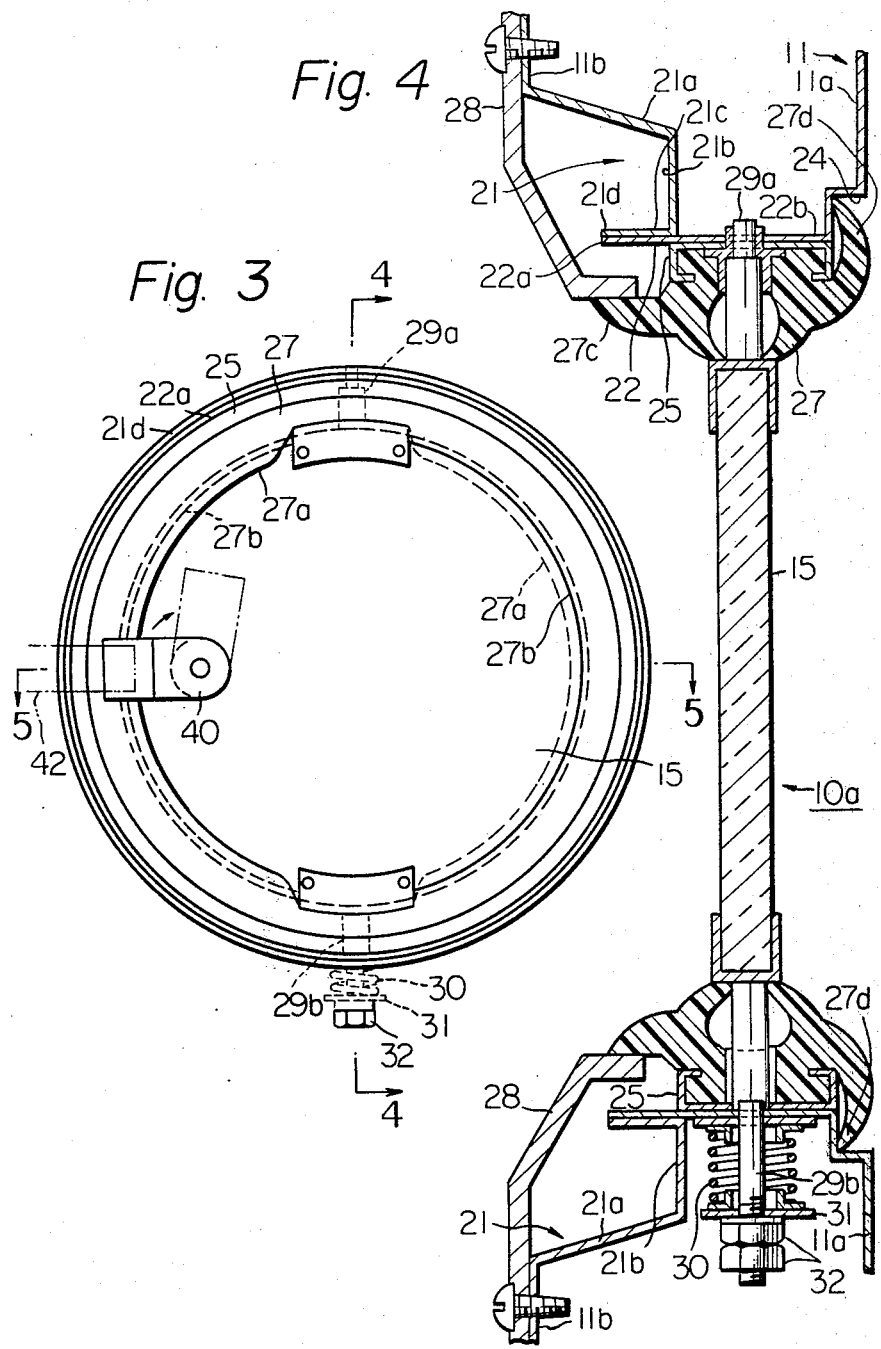

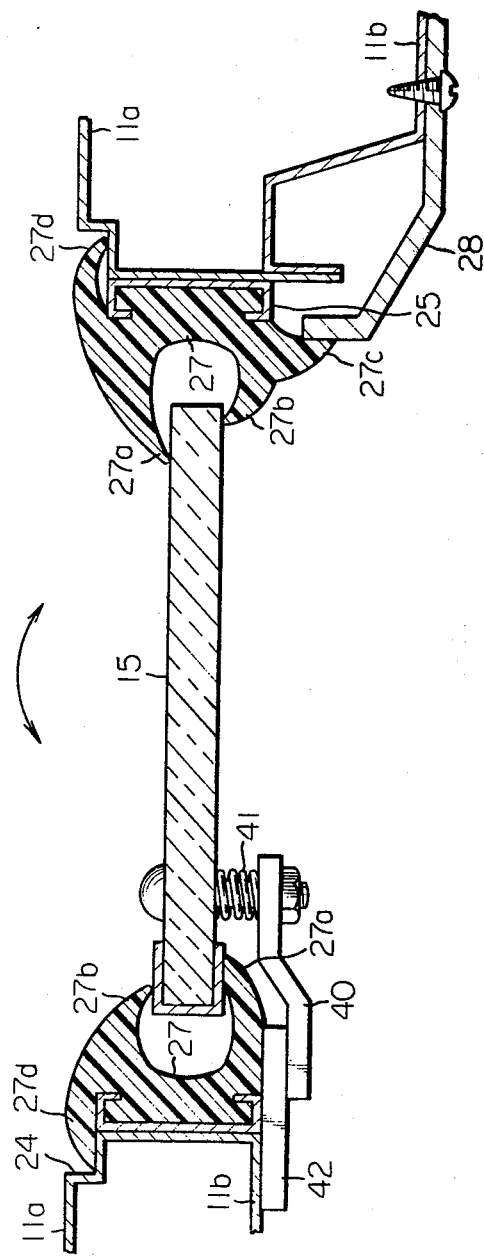

METHOD OF MAKING AN AUTOMOBILE WINDOW AND FRAME

The present invention relates to a window and frame assembly for a rear pillar of an automotive vehicle.

It is often desirable to provide a window in a rear pillar of an automobile if the rear pillar is large enough. A prior art method of making a window assembly in a rear pillar involves bending the edge portions of openings provided through the rear pillar panels inwardly and joining them together to form a window frame. The window is fixed to the frame by a sealing member or weather strip or is pivotally mounted in the window frame to mate with the sealing member. However, the window frame extends inwardly, thereby limiting the size of the window. It is also difficult to provide pivots on the window so that the window can be opened. In this prior art arrangement, one of the electrodes of a spot welding machine must be placed inside the window frame in order to spot weld the bent edge portions of the panels constituting the window frame, which is a cumbersome operation.

It is therefore an object of the invention to provide a window and frame assembly in which the bent edges of the panels constituting the window frame can be easily spot welded together without passing an electrode through the window.

It is another object of the invention to provide a window and frame assembly allowing the size of the window to be maximized and the window to be easily pivotally mounted in the window frame.

These and other objects and features of the invention will become apparent from the following description taken in conjunction with the accompanying drawings, in which:

FIG. 3 is a side view in elevation of a window assembly in accordance with the present invention;

FIG. 4 is a cross-sectional view in elevation taken along a line 4—4 of FIG. 3; and FIG. 5 is a cross-sectional view taken along a line 5—5 of FIG. 3.

Figure 1:
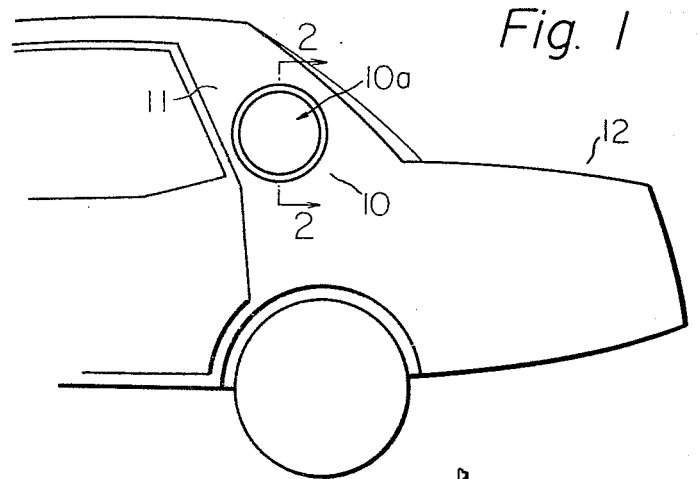
FIG. 1 is a schematic side view of a rear portion of an automotive vehicle with a rear-pillar window.
Figure 2:
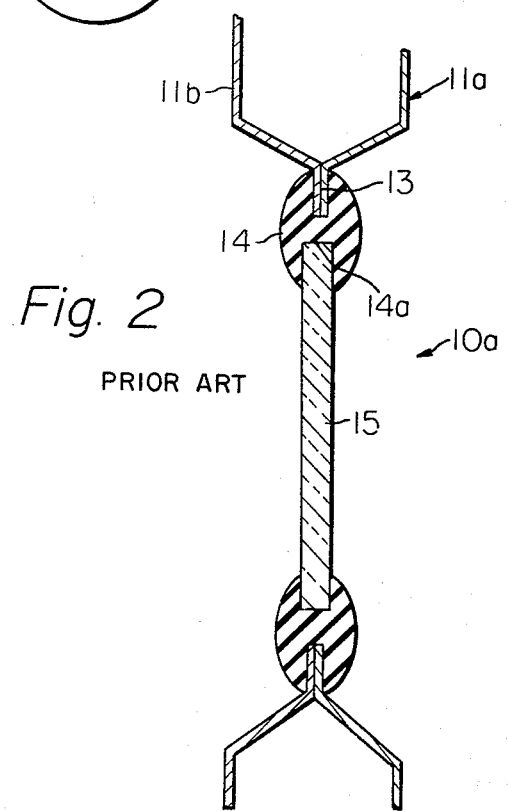
FIG. 2 is a cross-sectional view in elevation of a prior art window assembly taken along a line 2—2 of FIG. 1.

Referring now to the drawings wherein like parts are indicated by like numerals throughout the several views in FIG. 1 there is shown a window assembly 10 constructed in a rear pillar 11 of an automotive vehicle 12. A similar window assembly 10 may be provided in the other rear pillar of the vehicle. In FIG. 2, a prior art rear pillar window assembly is shown for comparison purposes. In the prior art method of making the window assembly, the edge portions of openings 10a through outer and inner panels 11a and 11b of the rear pillar 11 are bent toward each other and joined together as shown to form a window frame 13. A windowpane 15 is fixedly supported within a groove 14a of a sealing member 14 fixed to the window frame 13. Since the window frame 13 and the sealing member 14 extend substantially into the opening 10a, the range of visibility is restricted and the provision of pivots thereto, about which the windowpane 15 is rotatable to open the window, would further restrict the range of visibility.

Referring in conjunction to FIGS. 3 and 4, the basic method of the invention is to bend an edge portion of the inner panel 11b to form a channel 21 as shown, having a radially outer wall 21a, a bottom 21b and a radially inner folded back edge portion 21c. An edge portion 22 of the outer panel 11a is bent inwards as shown so that a section thereof mates with the edge portion 21c of the inner panel 11b. The edge portion 21c and the edge portion 22 are perpendicular to the plane of the windowpane 15. Edges 21d and 22a of the inner and outer panels 11b and 11a respectively are spaced between the inner panel 11b proper and the windowpane 15, and the bottom 21b of the channel is spaced between the edges 21d and 22a and the windowpane 15. If desired, the inner panel 11a may be recessed as at 24. A section of the edge portion 22 between the bottom 21b of the channel and the recess 24 constitutes a window frame 22b. A sealing channel 25 is fixed to the frame 22b, and the edges of the channel 25 may be bent inwards as shown. A weatherstrip or sealing member 27 is received in the channel 25, which opens radially inward, and the sealing member 27 has sealing lips 27a, 27b, 27c and 27d. Diametrically opposed holes (no numerals) are formed through the window frame 22b, and diametrically opposed shafts 29a and 29b pivotally extend through the holes to rotatably mount the windowpane 15 in the window frame 22b. The shafts 29a and 29b may be fixed to the periphery of the windowpane 15 in any known manner.

The end of the shaft 29a is rotatably mounted to the upper (as shown) portion of the window frame 22b by a nut (no numeral), and the shaft 29b is spring mounted to the lower portion of the frame 22b by a compression spring 30, a spring retainer 31 and nuts 32. A third or trim panel 28 is fixed to the inner panel 11b, and is bent around the edge 21d and 22a to be radially spaced inward therefrom. The edges (no numerals) of the trim panel 28 and the window frame 22b are sealed by the lips 27c and 27d respectively of the sealing member 27. The width of the channel is w as shown in FIG. 4.

Referring now to FIG. 5, the sealing lips and a handle assembly are clearly shown. The sealing lips 27a and 27b are arranged to seal the edge of the windowpane 15, and the lip 27a is longer than the lip 27b to resiliently hold the windowpane 15 in a closed position. The lip 27b is arranged to deform and snap back over the edge of the windowpane 15 when the window is closed.

A handle 40 loaded by a spring 41 is also shown, and also a stationary member 42 to engage with the handle 40.

The channel 21 is designed to allow easy spot welding of the edge portion 21c to the edge portion 22 from one side of the window assembly 10, and the arrangement of the window frame 22b maximizes the allowable size of the windowpane 15 and allows easy pivotal mounting of the windowpane 15 in the window frame 22b.

If desired, the relative positions of the outer and inner panels 11a and 11b respectively may be reversed within the scope of the invention.

I claim:

1. In a method of constructing a window in a rear pillar of an automotive vehicle, the rear pillar including first and second spaced panels having aligned holes formed therethrough to receive the window and the edge portions of the holes bent and joined together to form the window frame, the improvement comprising the steps of;

a. bending the edge portion of the first panel to form a channel, the bottom of the channel facing the second panel and a folded back edge portion of the channel being perpendicular to the plane of the window;

b. bending the edge portion of the second panel toward the first panel so that the edge portion of the second panel is parallel to and mates with the folded back edge portion of the first panel;

c. joining the mated edge portions together, the edges thereat being spaced between the first panel proper and the window and the section of the edge portion of the second panel between the bottom of the channel and the second panel proper constituting the window frame;

d. fixing a third panel to the first panel to cover the channel;

e. bending the radially inner edge portion of the third panel toward the second panel over the mated edge portions of the first and second panels;

f. forming a sealing channel on the inner periphery of the window frame opening radially inwardly;

g. inserting a sealing member into the sealing channel, the sealing member covering the edges of the third panel and the window frame; and h. mounting the window pivotally in the window frame.

2. The improvement of claim 1, in which the bottom of the channel is spaced between the planes of the window and the first panel proper.

3. The improvement of claim 1, in which the window has two diametrically opposed holes formed therethrough and the window has two diametrically opposed shafts fixed thereto, the shafts being rotatable in the respective holes.

4. The improvement of claim 3, in which the window is biased by a spring along the axis of the shafts.

5. The improvement of claim 1, in which the window is circular.

* * * * *